United States Patent
Bravo et al.

(10) Patent No.: US 8,917,826 B2
(45) Date of Patent: Dec. 23, 2014

(54) DETECTING MAN-IN-THE-MIDDLE ATTACKS IN ELECTRONIC TRANSACTIONS USING PROMPTS

(75) Inventors: Jose F. Bravo, Mamaroneck, NY (US); Jeffery L. Crume, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 13/562,491

(22) Filed: Jul. 31, 2012

(65) Prior Publication Data

US 2014/0037074 A1     Feb. 6, 2014

(51) Int. Cl.
*H04M 1/64*     (2006.01)
*G06Q 20/00*     (2012.01)

(52) U.S. Cl.
USPC .......................................... 379/88.01; 705/75

(58) Field of Classification Search
CPC ....... G06Q 10/10; G06Q 20/00; G06Q 20/10; G06Q 20/382; G06Q 20/401; G06Q 20/4016; G06Q 20/403; G06Q 40/02; G06Q 40/04; G07F 17/32; G07F 17/3218; G07F 17/3223; G07F 17/3286; H04H 20/78
USPC .......................... 379/67.01; 705/64, 75, 14.51
See application file for complete search history.

(56) References Cited

U.S. PATENT DOCUMENTS

| | | |
|---|---|---|
| 4,310,720 A | 1/1982 | Check, Jr. |
| 5,046,082 A | 9/1991 | Zicker et al. |
| 5,068,894 A | 11/1991 | Hoppe |
| 5,323,465 A | 6/1994 | Avarne |
| 5,457,737 A | 10/1995 | Wen |
| 5,491,752 A | 2/1996 | Kaufman et al. |
| 5,497,411 A | 3/1996 | Pellerin |
| 5,657,388 A | 8/1997 | Weiss |

(Continued)

FOREIGN PATENT DOCUMENTS

| DE | 10317176 A1 | 11/2004 |
|---|---|---|
| EP | 1119147 A1 | 7/2001 |

(Continued)

OTHER PUBLICATIONS

Bibbee, U.S. Appl. No. 11/765,193, Examiner's Answer, Apr. 16, 2013, 20 pages.

(Continued)

*Primary Examiner* — Fan Tsang
*Assistant Examiner* — Solomon Bezuayehu
(74) *Attorney, Agent, or Firm* — Douglas A. Lashmit; Hoffman Warnick LLC

(57) ABSTRACT

Aspects of the invention provide a solution for detecting man-in-the-middle attacks in electronic transactions using prompts. One embodiment includes a method for authenticating an electronic transaction. The method includes: receiving an electronic transaction request from a user, determining an IP address associated with a client system from which the electronic transaction request originates, providing the user with a password associated with the electronic transaction request, receiving a telephonic communication from a telephonic device associated with the user, prompting the user, via a voice response unit, to input the password using the telephonic device, authenticating the user by comparing the inputted password and the provided password, determining a probable location of the user based on the determined IP address of the client system, communicating to the user the probable location of the user based on the determined IP address, and prompting the user to confirm the probable location of the user.

21 Claims, 3 Drawing Sheets

(56) References Cited

U.S. PATENT DOCUMENTS

| | | | |
|---|---|---|---|
| 5,684,950 A | 11/1997 | Dare et al. | |
| 5,701,339 A | 12/1997 | Suda | |
| 5,749,052 A | 5/1998 | Hidem et al. | |
| 5,841,871 A | 11/1998 | Pinkas | |
| 5,842,124 A | 11/1998 | Kenagy et al. | |
| 5,892,902 A | 4/1999 | Clark | |
| 5,953,422 A | 9/1999 | Angelo et al. | |
| 5,971,272 A | 10/1999 | Hsiao | |
| 6,000,031 A | 12/1999 | Bingaman et al. | |
| 6,169,890 B1 | 1/2001 | Vatanen | |
| 6,278,863 B1 | 8/2001 | Mabrouki | |
| 6,308,268 B1 | 10/2001 | Audebert | |
| 6,324,271 B1 | 11/2001 | Sawyer et al. | |
| 6,330,608 B1 | 12/2001 | Stiles | |
| 6,334,056 B1 | 12/2001 | Holmes et al. | |
| 6,338,140 B1 | 1/2002 | Owens et al. | |
| 6,349,134 B1 | 2/2002 | Katz | |
| 6,385,729 B1 | 5/2002 | DiGiorgio et al. | |
| 6,387,729 B2 | 5/2002 | Eng et al. | |
| 6,393,468 B1 | 5/2002 | McGee | |
| 6,400,726 B1 | 6/2002 | Piret et al. | |
| 6,466,780 B1 | 10/2002 | Geiselman et al. | |
| 6,535,726 B1 | 3/2003 | Johnson | |
| 6,584,309 B1 | 6/2003 | Whigham | |
| 6,687,241 B1 | 2/2004 | Goss | |
| 6,707,915 B1 | 3/2004 | Jobst et al. | |
| 6,731,731 B1 | 5/2004 | Ueshima | |
| 6,934,858 B2 * | 8/2005 | Woodhill | 726/5 |
| 6,993,658 B1 | 1/2006 | Engberg et al. | |
| 6,993,663 B1 | 1/2006 | Paya et al. | |
| 7,007,301 B2 | 2/2006 | Crosbie et al. | |
| 7,024,688 B1 | 4/2006 | Faccin et al. | |
| 7,025,179 B2 | 4/2006 | Shih | |
| 7,028,179 B2 | 4/2006 | Anderson et al. | |
| 7,058,796 B2 | 6/2006 | Lynn et al. | |
| 7,058,968 B2 | 6/2006 | Rowland et al. | |
| 7,100,204 B1 | 8/2006 | Myllymaki et al. | |
| 7,133,662 B2 | 11/2006 | Bravo et al. | |
| 7,142,840 B1 | 11/2006 | Geddes et al. | |
| 7,221,949 B2 | 5/2007 | Clough | |
| 7,290,278 B2 | 10/2007 | Cahill et al. | |
| 7,317,693 B1 | 1/2008 | Roesch et al. | |
| 7,324,976 B2 | 1/2008 | Gupta et al. | |
| 7,337,431 B1 | 2/2008 | Barnes et al. | |
| 7,357,310 B2 | 4/2008 | Calabrese et al. | |
| 7,360,248 B1 | 4/2008 | Kanevsky et al. | |
| 7,376,431 B2 | 5/2008 | Niedermeyer | |
| 7,379,921 B1 | 5/2008 | Kiliccote | |
| 7,380,708 B1 | 6/2008 | Kiliccote | |
| 7,447,494 B2 | 11/2008 | Law et al. | |
| 7,480,805 B1 | 1/2009 | Gnech et al. | |
| 7,491,308 B2 | 2/2009 | Talieh et al. | |
| 7,519,989 B2 | 4/2009 | Lin et al. | |
| 7,533,414 B1 | 5/2009 | Reed et al. | |
| 7,536,634 B2 | 5/2009 | Green et al. | |
| 7,540,022 B2 | 5/2009 | Barrari et al. | |
| 7,594,270 B2 | 9/2009 | Church et al. | |
| 7,600,676 B1 | 10/2009 | Rados et al. | |
| 7,609,625 B2 | 10/2009 | Wei et al. | |
| 7,623,458 B2 | 11/2009 | Ayyagari et al. | |
| 7,624,447 B1 | 11/2009 | Horowitz et al. | |
| 7,665,128 B2 | 2/2010 | Yang | |
| 7,673,334 B2 | 3/2010 | Takemori et al. | |
| 7,715,823 B2 | 5/2010 | Bravo et al. | |
| 7,716,742 B1 | 5/2010 | Roesch et al. | |
| 7,757,285 B2 | 7/2010 | Kubota | |
| 7,765,584 B2 | 7/2010 | Roskind | |
| 7,779,465 B2 | 8/2010 | Baker et al. | |
| 7,823,199 B1 | 10/2010 | Rathi et al. | |
| 7,840,993 B2 | 11/2010 | Ganesan et al. | |
| 7,845,004 B2 | 11/2010 | Bardsley et al. | |
| 7,886,346 B2 | 2/2011 | Sandhu et al. | |
| 7,926,108 B2 | 4/2011 | Rand et al. | |
| 7,930,540 B2 | 4/2011 | Ahuja et al. | |
| 7,954,150 B2 | 5/2011 | Croft et al. | |
| 7,975,293 B2 | 7/2011 | Yoshida et al. | |
| 8,019,995 B2 | 9/2011 | van Bemmel | |
| 8,024,567 B2 | 9/2011 | Han | |
| 8,050,658 B2 | 11/2011 | Hong | |
| 8,060,915 B2 | 11/2011 | Voice et al. | |
| 8,136,150 B2 | 3/2012 | Hayler et al. | |
| 8,150,370 B2 | 4/2012 | Dempo et al. | |
| 8,151,327 B2 | 4/2012 | Eisen | |
| 8,181,248 B2 | 5/2012 | Oh et al. | |
| 8,201,217 B1 | 6/2012 | Begen et al. | |
| 8,254,542 B2 | 8/2012 | Frederick | |
| 8,281,375 B2 | 10/2012 | von Krogh | |
| 8,285,639 B2 | 10/2012 | Eden et al. | |
| 8,296,823 B2 | 10/2012 | Schubert | |
| 8,301,877 B2 | 10/2012 | Grajek et al. | |
| 8,302,180 B1 | 10/2012 | Gudov et al. | |
| 8,302,187 B1 | 10/2012 | Gupta et al. | |
| 2001/0054155 A1 | 12/2001 | Hagan et al. | |
| 2002/0069165 A1 | 6/2002 | O'Neil | |
| 2002/0091931 A1 | 7/2002 | Quick et al. | |
| 2002/0095588 A1 | 7/2002 | Shigematsu et al. | |
| 2002/0178070 A1 | 11/2002 | Leveridge | |
| 2002/0178370 A1 | 11/2002 | Gurevich et al. | |
| 2003/0014315 A1 | 1/2003 | Jaalinoja et al. | |
| 2003/0154382 A1 | 8/2003 | Vicard | |
| 2003/0172272 A1 | 9/2003 | Ehlers et al. | |
| 2004/0148520 A1 | 7/2004 | Talpade et al. | |
| 2004/0152446 A1 | 8/2004 | Saunders et al. | |
| 2004/0198329 A1 | 10/2004 | Vasa | |
| 2004/0243856 A1 | 12/2004 | Shatford | |
| 2005/0015624 A1 | 1/2005 | Ginter et al. | |
| 2005/0018618 A1 | 1/2005 | Mualem et al. | |
| 2005/0022020 A1 | 1/2005 | Fremberg | |
| 2005/0060535 A1 | 3/2005 | Bartas | |
| 2005/0075070 A1 | 4/2005 | Crilly, Jr. | |
| 2005/0182958 A1 | 8/2005 | Pham et al. | |
| 2005/0187934 A1 | 8/2005 | Motsinger et al. | |
| 2005/0188423 A1 | 8/2005 | Motsinger et al. | |
| 2005/0210251 A1 | 9/2005 | Nyberg et al. | |
| 2006/0021031 A1 | 1/2006 | Leahy et al. | |
| 2006/0036690 A1 | 2/2006 | O'Neil | |
| 2006/0094403 A1 | 5/2006 | Norefors et al. | |
| 2006/0095955 A1 | 5/2006 | Vong | |
| 2006/0179304 A1 | 8/2006 | Han | |
| 2006/0248021 A1 * | 11/2006 | Jain et al. | 705/75 |
| 2006/0288411 A1 | 12/2006 | Garg et al. | |
| 2007/0015492 A1 | 1/2007 | Bravo et al. | |
| 2007/0067828 A1 | 3/2007 | Bychkov | |
| 2007/0083606 A1 | 4/2007 | Malik et al. | |
| 2007/0084913 A1 | 4/2007 | Weston | |
| 2007/0107050 A1 | 5/2007 | Selvarajan | |
| 2007/0136573 A1 | 6/2007 | Steinberg | |
| 2007/0136808 A1 | 6/2007 | Xiong | |
| 2007/0143851 A1 | 6/2007 | Nocodemus et al. | |
| 2007/0186099 A1 | 8/2007 | Beck et al. | |
| 2007/0220275 A1 | 9/2007 | Heitzeberg et al. | |
| 2007/0234426 A1 | 10/2007 | Khanolkar et al. | |
| 2007/0261112 A1 | 11/2007 | Todd et al. | |
| 2007/0266257 A1 | 11/2007 | Camaisa et al. | |
| 2008/0028447 A1 | 1/2008 | O'Malley et al. | |
| 2008/0172730 A1 | 7/2008 | Sandhu et al. | |
| 2008/0181380 A1 | 7/2008 | Gustave et al. | |
| 2008/0189776 A1 | 8/2008 | Constable | |
| 2008/0209275 A1 | 8/2008 | Kwan et al. | |
| 2008/0270301 A1 | 10/2008 | Jones et al. | |
| 2008/0318548 A1 | 12/2008 | Bravo et al. | |
| 2009/0037329 A1 | 2/2009 | Coppinger et al. | |
| 2009/0077637 A1 | 3/2009 | Santos et al. | |
| 2009/0094682 A1 | 4/2009 | Sage et al. | |
| 2009/0104889 A1 | 4/2009 | Lotvonen et al. | |
| 2009/0106138 A1 | 4/2009 | Smith et al. | |
| 2009/0300738 A1 | 12/2009 | Dewe et al. | |
| 2010/0024017 A1 | 1/2010 | Ashfield et al. | |
| 2010/0051686 A1 | 3/2010 | Obi | |
| 2010/0095351 A1 | 4/2010 | Liu et al. | |
| 2010/0269162 A1 | 10/2010 | Bravo et al. | |
| 2011/0039237 A1 | 2/2011 | Skare | |
| 2011/0138483 A1 | 6/2011 | Bravo et al. | |
| 2011/0154459 A1 | 6/2011 | Kuang et al. | |

(56) References Cited

U.S. PATENT DOCUMENTS

| | | | |
|---|---|---|---|
| 2011/0197070 | A1 | 8/2011 | Mizrah |
| 2011/0225647 | A1 | 9/2011 | Dilley et al. |
| 2011/0277024 | A1 | 11/2011 | Begley et al. |
| 2011/0289576 | A1 | 11/2011 | Cheng |
| 2011/0307366 | A1* | 12/2011 | Ahuja et al. ............... 705/37 |
| 2012/0011066 | A1 | 1/2012 | Telle et al. |
| 2012/0149334 | A1 | 6/2012 | Zhang et al. |
| 2012/0180097 | A1* | 7/2012 | Addington et al. ........... 725/109 |
| 2012/0204241 | A1 | 8/2012 | Varsavsky Waisman-Diamond et al. |
| 2012/0264405 | A1 | 10/2012 | Bravo et al. |
| 2012/0272331 | A1 | 10/2012 | Lemaster et al. |
| 2013/0007859 | A1 | 1/2013 | Bravo et al. |
| 2014/0011561 | A1* | 1/2014 | Lutnick et al. ............... 463/17 |
| 2014/0016634 | A1* | 1/2014 | Khan et al. ............... 370/352 |
| 2014/0033279 | A1* | 1/2014 | Nimashakavi et al. ........... 726/4 |

FOREIGN PATENT DOCUMENTS

| | | | |
|---|---|---|---|
| GB | 2456509 | A | 7/2009 |
| JP | 10334048 | | 12/1998 |
| JP | 10334048 | A | 12/1998 |
| JP | 10341224 | A | 12/1998 |
| JP | 2001111545 | | 4/2001 |
| WO | 0109808 | A1 | 2/2001 |
| WO | 2004079499 | A2 | 9/2004 |
| WO | 2006103387 | A1 | 10/2006 |
| WO | 2008147353 | A1 | 12/2008 |

OTHER PUBLICATIONS

Almeida, U.S. Appl. No. 12/630,875, Office Action, Apr. 17, 2013, 40 pages.

Lakhia, U.S. Appl. No. 11/753,673, Notice of Allowance & Fees Due, dated May 10, 2013, 28 pages.

Vaughan, U.S. Appl. No. 12/423,928, Notice of Allowance & Fees Due, Jul. 11, 2013, 25 pages.

Alicherry et al.; "DoubleCheck: Multi-Path Verification Against Man-in-the-Middle Attacks", ISCC IEEE Symposium on, Jul. 5-8, 2009, pp. 557-563.

Kooi et al.; "VoIP Interception in PcP SIP Environment", ICCAE 2nd International Conference on, vol. 1, Feb. 26-28, 2010, pp. 331-334.

Kopsidas et al.; "Voice Interactive Personalized Security (VoIPSEC) Protocol . . . and Biometric Verification", HOTWEB 1st IEEE Workshop on, Nov. 13-14, 2006, pp. 1-10.

Leung Chun-Ming; "Depress Phishing by CAPTCHA with OTP", ASID 3rd International Conference on, Aug. 20-22, 2009, pp. 187-192.

Kumaraguru et al., "Getting Users to Pay Attention to Antiphishing Education: Evaluation of Retention and Transfer", APWG eCrime Researchers Summit, Oct. 4-5, 2007, pp. 70-81, Pittsburgh, PA.

Adida, "Beamauth: Two-Factor Web Authentication with a Bookmark", CCS, Oct. 29-Nov. 2, 2007, pp. 48-57, Alexandria, VA.

Nassar et al., "Holistic VoIP Intrusion Detection and Prevention System", IPTCOMM, 2007, pp. 1-9, New York.

Stoll et al., "Sesame: Informing User Security Decisions with System Visualization", CHI, Apr. 5-10, 2008, pp. 1045-1053, Florience Italy.

"Prevent Online Banking Fraud", Dec. 7, 2010, http://www.phonefactor.com/products/transaction-verification, 1 pages.

Vaughan, U.S. Appl. No. 13/613,502, Office Action Communication, Jul. 18, 2013, 54 pages.

Gee, U.S. Appl. No. 13/084,823, Office Action Communication, Jul. 19, 2013, 24 pages.

Almeida, U.S. Appl. No. 12/630,875, Office Action Communication, Aug. 7, 2013, 15 pages.

U.S. Appl. No. 12/630,875, Notice of allowance and Fee(s) Due dated Nov. 18, 2013, IBMC-0353, 19 pages.

Ma et al., "Beyond Blacklists: Learning to Detect Malicious Web Sites from Suspicious URLs", KDD '09, Jul. 28-Jul. 1, 2009, pp. 1245-1253.

Lakhia, U.S. Appl. No. 13/432,956, Notice of Allowance & Fees Due, Apr. 15, 2013, 27 pages.

Lakhia, U.S. Appl. No. 11/753,673, Office Action 1, IBMC-0208, 13 pages, Apr. 15, 2010.

Lakhia, U.S. Appl. No. 11/753,673, Final Office Action 1, IBMC-0208, 13 pages, Oct. 8, 2010.

Lakhia, U.S. Appl. No. 11/753,673, Office Action 2, IBMC-0208, 15 pages, Dec. 22, 2011.

Lakhia, U.S. Appl. No. 11/753,673, Notice of Allowance 1, IBMC-0208, 11 pages, Jun. 18, 2012.

Lakhia, U.S. Appl. No. 11/753,673, Notice of Allowance 2, IBMC-0208, 14 pages, Jan. 8, 2013.

Megeed, U.S. Appl. No. 12/423,928, Office Action 1, IBMC-0326, 21 pages, Aug. 25, 2011.

Megeed, U.S. Appl. No. 12/423,928, Final Office Action 1, IBMC-0326, 20 pages, Nov. 10, 2011.

Megeed, U.S. Appl. No. 12/423,928, Office Action 2, IBMC-0326, 20 pages, Jun. 8, 2012.

Megeed, U.S. Appl. No. 12/423,928, Notice of Allowance 1, IBMC-0326, 10 pages, Sep. 25, 2012.

Megeed, U.S. Appl. No. 12/423,928, Notice of Allowance 2, IBMC-0326, 19 pages, Dec. 4, 2012.

Bibbee, U.S. Appl. No. 11/765,193, Office Action 1, 15 pages, Feb. 18, 2010.

Bibbee, U.S. Appl. No. 11/765,193, Office Action 2, 14 pages, Nov. 29, 2010.

Bibbee, U.S. Appl. No. 11/765,193, Office Action 3, 18 pages, Sep. 19, 2011.

Bibbee, U.S. Appl. No. 11/765,193, Final Office Action 1, 15 pages, Jul. 30, 2010.

Bibbee, U.S. Appl. No. 11/765,193, Final Office Action 2, 17 pages, May 12, 2011.

Bibbee, U.S. Appl. No. 11/765,193, Final Office Action 3, 18 pages, Apr. 16, 2012.

Tran, U.S. Appl. No. 11/524,340, Office Action, 9 pages, Jul. 29, 2009.

Tran, U.S. Appl. No. 11/524,340, Office Action, 19 pages, Oct. 31, 2008.

Tran, U.S. Appl. No. 11/524,340, Notice of Allowance, 11 pages, Dec. 29, 2009.

Tran, U.S. Appl. No. 11/524,340, Office Action, 7 pages, Apr. 29, 2009.

Tran, U.S. Appl. No. 11/524,340, Office Action, 22 pages, May 27, 2008.

Juels, "Strengthening EPC Tags Against Cloning", WISE '05, Sep. 2, 2005, pp. 67-75.

Almeida, U.S. Appl. No. 12/630,875, Office Action, Mar. 1, 2012, 17 pages.

Almeida, U.S. Appl. No. 12/630,875, Office Action, Aug. 30, 2012, 14 pages.

Almeida, U.S. Appl. No. 12/630,875, Notice of Allowance, Dec. 20, 2012, 7 pages.

Stoll et al., "Sesame: Informing User Security Decisions with System Visualization", CHI 2008 Proceedings, Am I Safe, Apr. 5-10, 2008, Florence, Italy, pp. 1045-1054.

Lee et al., "A Resilient Packet-Forwarding Scheme against Maliciously Packet-Dropping Nodes in Sensor Networks" SASN '06, Oct. 30, 2005, ACM 1-59593-544-J/06/0010, pp. 59-69.

Deng et al., "Defending Against Redirect Attacks in Mobile IP", CCS '02, Nov. 18-22, 2002, ACM 1-58113-612-9/02/0011, pp. 59-67.

Kaafar et al., "Real attacks on virtual networks: Vivaldi out of tune", SIGCOMM '06 Workshops, Sep. 11-15, 2006, ACM 1-59593-417-0/06/0009, pp. 139-146.

Geneiatakis et al., "Survey of Security Vulnerabilities in Session Initiation Protocol", 3rd Quarter 2006, vol. 8, No. 3, IEEE Communications Surveys & Tutorials, pp. 68-81.

Gee, U.S. Appl. No. 13/084,823, Office Action, IBMC-0395, Mar. 11, 2013, 8 pages.

Bonzo, U.S. Appl. No. 11/776,619, Office Action, Sep. 30, 2009, 12 pages.

Bonzo, U.S. Appl. No. 11/776,619, Notice of Allowance, Apr. 29, 2010, 10 pages.

(56) References Cited

OTHER PUBLICATIONS

Lakhia, U.S. Appl. No. 13/432,956, Office Action 1, IBMC-0208-CON, Feb. 14, 2013, 26 pages.

Viral, U.S. Appl. No. 11/753,673, Notice of Allowance, Aug. 21, 2012, 7 pages.

U.S. Appl. No. 13/084,826, Office Action dated Feb. 3, 2014, IBMC-0395, 12 pages.

U.S. Appl. No. 13/613,502, Notice of allowance and Fee(s) Due dated Jan. 27, 2014, IBMC-0326-CON, 14 pages.

U.S. Appl. No. 13/084,823, Notice of Allowance and Fees Due, May 1, 2014, 16 pages.

* cited by examiner

DETECTING MAN-IN-THE-MIDDLE ATTACKS IN ELECTRONIC TRANSACTIONS USING PROMPTS

BACKGROUND

1. Technical Field

The subject matter disclosed herein relates generally to a transaction authentication system. Specifically, the subject matter disclosed herein relates to detecting man-in-the-middle attacks in electronic transactions using prompts.

2. Related Art

Use of electronic media has quickly become the preferred means for a user to conduct electronic transactions. Users utilize transactions like, online-banking and Internet shopping every day, in order to avoid having to visit a physical location to conduct these transactions. However, these electronic transactions come with a heightened risk, as electronic transactions usually involve proprietary or sensitive information (e.g., bank account numbers, credit card numbers, etc.), collectively known as restricted user information. If a third party were to obtain this restricted user information, that party would be able to conduct transactions, which would typically be restricted, to simultaneously benefit the third party while harming the true owner of that restricted user information.

Third parties may obtain such information by conducting what is called a "man-in-the-middle" attack on an electronic transaction. A man-in-the-middle attack occurs when an third party computer system interposes itself between a user's computer system, used to conduct an electronic transaction, and a service provider's computer system, for providing the service involved in the electronic transaction. While interposed between the user and service provider systems, the third party computer system intercepts the restricted user information and electronic transaction information from the user's computer system, forwards along the gathered information to obtain access to the service providers system using the restricted user information, and conducts a distinct electronic transaction to benefit the third party and not the user. To keep the user from noticing the user's transaction has been interrupted by a man-in-the-middle attack, the third party system sends the user a fraudulent confirmation message or webpage confirming the user's electronic transaction information, when, in fact, a distinct electronic transaction has taken place. When a man-in-the-middle attack occurs, the user has no way of knowing until after the fraudulent electronic transaction has taken place, and the user desired electronic transaction has been discarded by the third party system.

BRIEF SUMMARY

A transactional authentication system is disclosed. One embodiment includes a method for authenticating an electronic transaction. The method includes: receiving an electronic transaction request from a user, the electronic transaction request originating at a client system; determining an IP address associated with the client system from which the received electronic transaction request originates; providing the user with a one time password associated with the electronic transaction request; receiving a telephonic communication from a telephonic device associated with the user; prompting the user, via a voice response unit, to input the password using the telephonic device; authenticating the user based on a comparison of the inputted password and the provided one time password; determining a probable location of the user based on the determined IP address of the client system; communicating to the user, via the voice response unit, the probable location of the user based on the determined IP address associated with the client system; and prompting the user to confirm the probable location of the user based on the IP address associated with the client system.

A first aspect of the invention includes a method for authenticating an electronic transaction. The method includes: receiving an electronic transaction request from a user, the electronic transaction request originating at a client system; determining an IP address associated with the client system from which the received electronic transaction request originates; providing the user with a one time password associated with the electronic transaction request; receiving a telephonic communication from a telephonic device associated with the user; prompting the user, via a voice response unit, to input the password using the telephonic device; authenticating the user based on a comparison of the inputted password and the provided one time password; determining a probable location of the user based on the determined IP address of the client system; communicating to the user, via the voice response unit, the probable location of the user based on the determined IP address associated with the client system; and prompting the user to confirm the probable location of the user based on the IP address associated with the client system.

A second aspect of the invention includes a computer system having: at least one computing device configured to authenticate a transaction by performing actions including: receiving an electronic transaction request from a user, the electronic transaction request originating at a client system; determining an IP address associated with the client system from which the received electronic transaction request originates; providing the user with a one time password associated with the electronic transaction request; receiving a telephonic communication from a telephonic device associated with the user; prompting the user, via a voice response unit, to input the password using the telephonic device; authenticating the user based on a comparison of the inputted password and the provided one time password; determining a probable location of the user based on the determined IP address of the client system; communicating to the user, via the voice response unit, the probable location of the user based on the determined IP address associated with the client system; and prompting the user to confirm the probable location of the user based on the IP address associated with the client system.

A third aspect of the invention includes a computer program product for authenticating an electronic transaction, the computer program product comprising a computer readable storage medium having program code embodied therewith, the program code executable by at least one computer system to perform a method. The method includes: receiving an electronic transaction request from a user, the electronic transaction request originating at a client system; determining an IP address associated with the client system from which the received electronic transaction request originates; providing the user with a one time password associated with the electronic transaction request; receiving a telephonic communication from a telephonic device associated with the user; prompting the user, via a voice response unit, to input the password using the telephonic device; authenticating the user based on a comparison of the inputted password and the provided one time password; determining a probable location of the user based on the determined IP address of the client system; communicating to the user, via the voice response unit, the probable location of the user based on the determined IP address associated with the client system; and prompting the user to confirm the probable location of the user based on the IP address associated with the client system.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
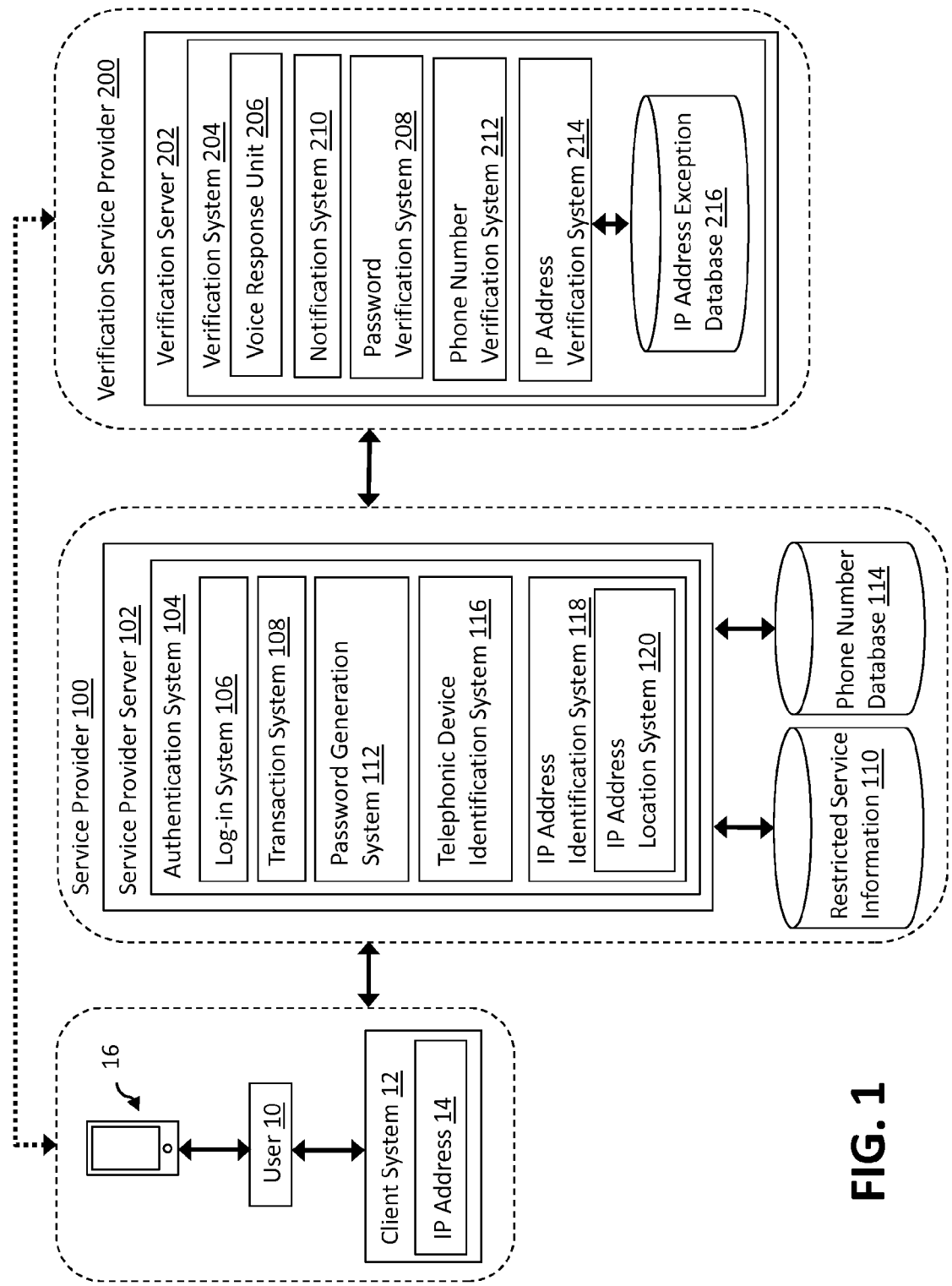
FIG. 1 shows a schematic depiction of a transactional authentication environment according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As described herein, aspects of the invention relate to a transaction authentication system. Specifically, as described herein, aspects of the invention relate to a system for authenticating transactions by verifying a user's transactional request location.

The described embodiments provide superior security for electronic transactions which involves a user's restricted information. More specifically, the authentication of the electronic transaction involving a service provider in the embodiments as described herein provides greater security than conventional authentication systems. In some authentication embodiments, such as that described in US 2008/0318548, published on Dec. 25, 2008, entitled "Method and System for Strong Authentication and Defense against Man-in-the-Middle Attacks," the contents of which are hereby incorporated by reference, the location of the user's computer IP address are examined by the restricted item provider to determine if the two are proximately located. The service provider, as described herein, and the restricted item provider, as described by the incorporated reference, may be any entity that provides goods and/or services, and controls access to restricted or user sensitive information, e.g., bank, business, website, server, etc.

Turning to FIG. 1, a schematic depiction of a transactional authentication environment according to embodiments of the invention is provided. The transactional authentication environment includes a service provider 100 and a third party verification service provider 200. As discussed above, service provider 100 may include any entity that provides goods and/or services, and controls access to restricted or user-sensitive information. User 10 may access the goods and/or services of service provider 100 using a client system 12. More specifically, user 10 may utilize client system 12 to access the goods and/or services of service provider 100 by communicating with a service provider server 102 of service provider 100 over a network. Client system 12 may include any device, software or system, such as a World Wide Web (web) browser included on a personal computer system, a handheld device, a smart-phone, an ATM machine, etc., which may include a unique network identifier. In an embodiment, as shown in FIG. 1, the unique network identifier of client system 12 may include an Internet Protocol (IP) address 14. Service provider server 102 may provide user 10 with an interactive website or any other conventional electronic medium in which user 10 may utilize client system 12 to conduct electronic transactions offered by service provider 100.

For example, service provider 100 may be a bank, and service provider server 102 may provide client system 12 with a banking website capable of processing banking transactions. Specifically in the example, service provider server 102 may provider client system 12 with a website, which may allow user 10, a member of the bank associated with service provider 100, to conduct electronic banking transactions using client system 12.

With respect to the authentication environment, authentication of user's 10 electronic transaction request of service provider 100 is provided below. In an embodiment, as shown in FIG. 1, service provider server 102 may include an authentication system 104 which may be implemented as any combination of hardware and software (i.e., a computer system and/or a program product). Authentication system 104 may further include sub-components for, at least in part, authenticating an electronic transaction request made by user 10. As shown in FIG. 1, authentication system 104 may include a log-in system 106. As a result of user 10 attempting to access service provider server 102 via client system 12, log-in system 106 may provide user 10 with a log-in mechanism to verify the specific user 10 attempting to access service provider server 102. More specifically, log-in system 106 may prompt user 10 to enter user 10 specific log-in information, e.g., user ID, user name, user e-mail, user password, etc., to verify the specific user 10 attempting to access service provider server 102.

In continuing the example embodiment above, user 10 may direct client system 12 to a bank website (e.g., service provider server 102) in order to conduct electronic banking transactions. After directing client system 12 to the bank website, log-in system 106 of authentication system 104 may prompt user 10 to enter a user ID and associated password to verify that user 10 is a member of the bank (e.g., service provider 100).

Authentication system 104 may also include a transaction system 108 which may collect information relating to electronic transaction requests made by user 10. More specifically, transaction system 108 may be configured to receive the electronic transaction requests made by user 10 requesting to access restricted service information 110. Restricted service information 110 may include any type of information for which authorization is required.

Continuing the example embodiment, after user 10 has successfully logged in to service provider server 102, user 10, via client system 12, may send an electronic transaction request to service provider server 102. For example, user 10 may send an electronic transaction requesting to transfer $500 USD from user's 10 checking account to user's 10 savings account, both of which may be accounts held by the bank (e.g., service provider 100). The account numbers associated with each of user's 10 accounts are restricted service information 110, and may be required to successfully process the electronic transaction request. Furthermore, the account numbers (e.g., restricted service information 110) may require further authorization before any transfer of user's 10 funds may be made.

Authentication system 104 may also include a password generation system 112. Password generation system 112 may be configured to generate a password for user 10 for, in part, authenticating user 10 electronic transaction request involving service provider 100. More specifically, password generation system 112 may generated a one-time password (OTP), and may relay the OTP to user 10 via service provider server 102. Additionally, service provider server 102 may prompt user 10 to contact and provide third party verification service 200 with the OTP generated by password generation system 112. In an embodiment, service provider server 102 may send the OTP to user 10 via client system 12. In an alternative embodiment, service provider server 102 may send the OTP to a telephonic device 16 unique to user 10. Telephonic device 16 may include, for example, any now known or later developed mobile device or local area network (LAN) telephone capable of telephonic communication. In an embodiment, telephonic device 16 associated with user 10 may include a phone number pre-registered with service provider 100, and may be stored in a phone number database 114 in communication with service provider server 102. More specifically, a phone number unique to telephonic device 16 may be stored in phone number database 114, and may be used, in part, for authentication of user's 10 electronic transaction request, as discussed below. In an alternative embodiment, the pre-registered phone number of telephonic device 16 may be registered with third party verification service provider 200 or any other third party service provider used in the authentication process of the embodiments described herein.

In the example, after user 10 submits an electronic transaction request to service provider server 102 via client system 12, and authentication system 104 recognizes the electronic transaction request requires further authentication, password generation system 112 may generate a multi-digit OTP ("0123456789") associated with user's 10 electronic transaction request of transferring $500 between accounts. The OTP generated by password generation system 112 may be provided to user 10 via service provider server's 102 banking website that is displayed on client system 12. Along with the OTP password generated by password generation system 112, service provider server 102 may prompt user 10 to call third party verification service provider 200 using telephonic device 16, and enter the OTP using telephonic device 16 when prompted.

In the embodiment, as shown in FIG. 1, authentication system 104 may also include a telephonic device identification system 116. Telephonic device identification system 116 may be configured to determine the pre-registered phone number of telephonic device 16 associated with user 10. More specifically, telephonic device identification system 116 may obtain the log-in information to identify specific user 10, and obtain the pre-registered phone number associated with user's 10 telephonic device 16 from phone number database 114. Telephonic device identification system 116 may also be configured to provide third party verification service provider 200 with the pre-registered phone number stored in phone number database 114 for, in part, authenticating user's 10 electronic transaction request.

Continuing the example, after user 10 receives the OTP generated by password generation system 112, telephonic device identification system 116 may determine the pre-registered phone number of telephonic device 16 that may be associated with user 10. That is, telephonic device identification system 116 may utilize user's 10 specific log-in information and obtain the pre-registered phone number of telephonic device 16 associated with user 10. Specifically, telephonic device identification system 116 may determine that user's 10 pre-registered phone number is "555-555-5555." Once telephonic device identification system 116 obtains user's 10 pre-registered phone number for telephonic device 16, telephonic device identification system 116 may send the user's 10 pre-registered phone number to third party verification service provider 200 using service provider server 102.

Further in an embodiment, as shown in FIG. 1, Authentication system 104 may include an IP address identification system 118. IP address identification system 118 may be configured to determine IP address 14 associated with client system 12 from which the electronic transaction request may originate. More specifically, IP address identification system 118 may obtain user's 10 electronic transaction request information which may include IP address 14 associated with client system 12 from which the electronic transaction request originated. IP address identification system 118 may include an IP address location system 120 which may take IP address 14 associated with client system 12 from which user's 10 electronic transaction request originated, and may determine a probable geographic location of client system 12. Systems for determining a probable geographic location of client system 12 based on IP address 14, such as IP address location system 120, are readily known in the art (e.g., www-.geobytes.com/IPlocator.htm). Further explanation of this system is omitted for clarity. IP address identification system 118 may also provide third party verification service provider 200 with the probable geographic location of client system 12 determined by IP address location system 120. The probable geographic location may be used, in part, to authentication the electronic transaction requested by user 10. In an alternative embodiment, IP address location system 120, or a system configured to perform similar functions, may be implemented by third party verification service provider 200, rather than service provider 100. More specifically, IP address identification system 118 of authentication system 104 may be configured to obtain IP address 14, and a system of third party verification service provider 200 may be configured to obtain IP address 14 from authentication system 104 and determine a probable geographic location of client system 12 based on the obtained IP address 14.

Continuing the example embodiment, IP address identification system 118 may determine IP address 14 associated with client system 12 from which the electronic transaction request originated. Specifically, IP address identification system 118 may determine IP address 14 is 12.34.567.89. IP address location system 120 may then take IP address 14 associated with client system 12 (e.g., IP address 12.34.567.89) and determine that client system's 12 probable geo-location is Washington, D.C. Utilizing service provider server 102, IP address identification system 118 may then transfer the probable geographic location of client system 12 (e.g., Washington, D.C.) to third party verification service provider 200 for, in part, authentication of the electronic transaction request (e.g., $500 bank account transfer) from user 10.

Although described in series above, it is understood that password generation system 112, telephonic device identification system 116 and/or IP address identification system 118 may perform each of their respective processes in parallel. For example, password generation system 118 may generate a OTP unique to user's 10 electronic transaction request in parallel to IP address identification system 118 determining IP address 14 associated with client system 12.

In an embodiment, as shown in FIG. 1, user 10 may verify information relating to the electronic transaction request by communicating with a verification server 202 of third party verification service provider 200. More specifically, user 10 may use telephonic device 16 to contact verification server 202 of third party verification service provider 200 to provide information (e.g., OTP, etc.) so service provider 100 may successfully authenticate and process user's 10 electronic transaction request. Verification server 202 may be configured as any conventional server now know or later developed, capable of receiving information for a remote device (e.g., pre-registered telephonic device 16, client system 12, etc.) over a network.

As shown in FIG. 1, verification server 202 may include a verification system 204 which may be implemented as any combination of hardware and software (i.e., a computer system and/or a program product). Similar to authentication system 104 as discussed above, verification system 204 may further include sub-components for, at least in part, verifying user 10 information so service provider 100 may authenticate an electronic transaction of user 10. As shown in FIG. 1, verification system 204 may include a voice response unit (VRU) 206. In an embodiment, VRU 206 of verification system 204 may be configured to prompt user 10 to input the OTP using telephonic device 16 after user 10 calls third party verification service provider 200. More specifically, VRU 206 may ask user 10, using computer simulated speech or a recording, to input the OTP generated by password generation system 112 of authentication system 104 using telephonic device 16.

Continuing the example above, once user 10 receives the OTP, and is prompted to call the provided number for third party verification service provider 200 by the bank (e.g., service provider 100), user 10 calls third party verification service provider 200 using his cell phone (e.g., telephonic device 16). User 10 may then be connected to verification server 202. Once connected, VRU 206 provides user 10 with, for example, the following simulated speech: "Please input the 10-digit one time password now." User 10 is able to hear this recording over user's 10 cell phone speaker and may then input the OTP using the number pad on his cell phone.

Verification system 204 may also include password processing system 208. Password processing system 208 may compare the inputted OTP by user 10 with the OTP generated by password generation system 112. More specifically, password processing system 208 may be configured to receive the OTP generated by password processing system 112 for user's 10 electronic transaction request and receive the OTP inputted by user 10 using telephonic device 16 to verify or authenticate that the inputted OTP is identical to the generated OTP. In an embodiment, if password processing system 208 verifies that user 10 inputted OTP is identical to the generated OTP, password processing system 208 may provide verification system 204 with instructions to continue the user 10 verification processes. In the alternative, if password processing system 208 determines that user 10 inputted OTP is not identical to the generated OTP, password processing system 208 may inform notification system 210 of verification system 204 that the inputted OTP is not identical to the generated OTP. Notification system 210 may be configured to provide service provider 100 with an "alert," which indicates that verification system 204 may have determined that user 10 may not be verified based on the information provided to third party verification service provider 200. As a result of the alert from notification system 210, user 10 may not be verified and user's 10 electronic transaction request may not be authenticated by servicer provider 100. In an embodiment, notification system 210 may alert service provider 100 that user 10 inputted OTP was not identical to the generated OTP. In an alternative embodiment, and as discussed in more detail below, notification system 210 may alert service provider 100 that the phone number associated with the telephonic device utilized to call third party verification service provider 200 was not identical to the pre-registered phone number associated with telephonic device 16. In another alternative embodiment, notification system 210 may alert service provider 100 that user 10 did not confirm that the probable geographic location of user 10 and/or client system 12 based on IP address 14 is substantially similar to the actual location of user 10 and/or client system 12.

In the example, after user 10 enters the multi-digit password ("0123456789") associated with the electronic transaction request (e.g., $500 account transfer) with the bank (e.g., servicer provider 100) using user's 10 cellphone (e.g., telephonic device 16), password verification system 208 may verify that user 10 inputted password is identical to the password provided to verification system 208 by authentication system 104 of the bank. In the example, password verification system 208 obtains user's 10 inputted password of "0123456789." Additionally, password verification may previously obtain a generated password of "0123456789" from bank's (e.g., servicer provider 100) authentication system 104. Password verification system 208 may then compare user 10 inputted password to the generated password and determine whether the two passwords are identical. As a result, password verification system 208 may communicate with verification system 204 to continue user 10 verification process.

In the embodiment, as shown in FIG. 1, verification system 204 may include a phone number verification system 212. Phone number verification system 212 may be configured to verify the phone number associated with the telephonic device user 10 utilizes to contact third party verification service provider 200. More specifically, phone number verification system 212 may obtain the pre-registered phone number associated with telephonic device 16 of user 10 from authentication 104, and determine if the obtained phone number is identical to the phone number associated with the telephonic device user 10 utilized to call third party verification service provider 200. In an embodiment, phone number verification system may obtain the phone number associated with the telephonic device used by user 10 by any now know or later developed process, e.g., caller ID, cell phone provider lookup, etc. In an embodiment, phone number verification system 212 may determine if the obtained pre-registered phone number is identical to the phone number associated with the telephonic device user 10 utilized to call third party verification service provider 200 after password verification system 208 determines user 10 inputted password is identical to the password generated by password generation system 112. In an alternative embodiment, phone number verification system 212 may determine if the obtained pre-registered phone number is identical to the phone number associated with the telephonic device user 10 utilizes to call third party verification service provider 200 immediately after user 10 calls third party verification service provider 200. In a further alternative embodiment, phone number verification system 212 may determine if the obtained pre-registered phone number is identical to the phone number associated with the telephonic device user 10 utilized to call third party verification service provider 200 in parallel to password verification system 208 determining that user 10 inputted password is identical to the password generated by password generation system 112.

Similar to password verification system 208, phone number verification system 212 may inform notification system 210 when the obtained pre-registered phone number associated with telephonic device 16 is not identical to the telephone number associated with the telephonic device utilized by user 10 to call third party verification servicer provider 200. As discussed above, notification system 210 may be configured to provide service provider 100 with an "alert," which indicates that verification system 204 may have determined that user 10 may not be verified based on the information provided to third party verification service provider 200. As a result of the alert from notification system 210, user 10 may not be verified and user's 10 electronic transaction request may not be authenticated by servicer provider 100. In an alternative embodiment, verification system 204 may continue the verification of user 10 even though the obtained pre-registered phone number associated with telephonic device 16 is not identical to the telephone number associated with the telephonic device utilized by user 10 to call third party verification service provider 200. More specifically, the alert from notification system 210, may prompt verification system 204 to utilize VRU 206, so user 10 may verify the pre-registered telephone number associated with user 10 is correct, or for user 10 to confirm the telephonic device utilized by user 10 has a number distinct from the pre-registered telephone number associated with user's 10 telephonic device 16. As a result, user 10 may by-pass this step of verification performed by verification system 204 and may continue with the verification process to successfully complete the electronic transaction. In the embodiment, phone number verification system 212 may obtain the pre-registered phone number associated with user's 10 telephonic device 16 from authentication system 104 in a electronic message between the two servers over a network. More specifically, authentication system 104 may send the generated OTP, associated phone number and IP address 14 of client system 12 (discussed below), in a single message to verification system 204. In an alternative embodiment, authentication system 104 may send each user's 10 information (e.g., pre-registered phone number, IP address 14, generated OTP, etc.) in distinct messages to verification system 204.

Continuing the example above, after user 10 has input an identical multi-digit password to the generated multi-digit password, phone number verification system 212 may determine if user's 10 cellphone includes a phone number identical to the pre-registered phone number associated with user's 10 telephonic device 16 stored on phone number database 114 of the bank's server (e.g., service provider server 102). In the example, phone number verification system 212 may obtain the phone number associated with the cellphone user 10 utilizes to call third party verification service provider 200 using a caller ID system (not shown), to determine user's 10 cellphone number is "555-555-5555." Phone number verification system 212 may then compare the determined cellphone number to the previously received pre-registered phone number associated with telephonic device 16, "555-555-5555." As a result of phone number verification system 212 determining the phone numbers are identical, phone number verification system 212 may communicate with verification system 204 to continue user 10 verification process.

In an embodiment, as best shown in FIG. 1, verification system 204 may also include an IP address verification system 214. IP address verification system 214 may be configured to provide the probable geographic location of client system 12 to user 10 from authentication system 104. More specifically, IP address verification system 214 may obtain a probable geographic location of client system 12 from IP address location system 120 of authentication system 104 and provide the probably geographic location to VRU 206 to be audibly provided to user 10 via telephonic device 16. In an embodiment, the computer simulated speech of VRU 206 may tell user 10 that client system 12 may be located in a probable geographic location, previously determined by IP address location system 120. Additionally, VRU 206 may prompt user 10 to confirm the probable geographic location of user 10 and/or client system 12 is correct. If user 10 confirms the probable geographic location of user 10 and/or client system 12, IP address verification system 214 may communicate with verification system 204 that probable geographic location of client system 12 has been verified and the verification process of user 10 may continue. However, if user 10 does not confirm the probable geographic location of user 10 and/or client system 12 is the actual (approximate) location of user 10 and/or client system 12, IP address verification system 214 may inform notification system 210 of this denial in confirmation. As discussed above, as a result of the alert from notification system 210, user 10 may not be verified and user's 10 electronic transaction request may not be authenticated by servicer provider 100.

In an alternative embodiment, where client system 12 is a component of a computing network, IP address verification system 214 of verification system 204 may also include an IP address exception database 216. IP address exception database 216 may include a list of pre-registered IP addresses which may be associated with proxies, or servers of the computing network which includes client system 12. As a result of the use of the computing network, each client system 12 of computing network may include the IP address associated with the proxies or servers of computing network, and not necessarily the IP address associated with the actual location of client system 12. In an embodiment, IP address verification system 214 may obtain IP address 14 from authentication system 104, and may determine IP address 14 is included in the pre-registered IP addresses stored on IP address exception database 216. As a result, the verification of the probable geographic location of user 10 and/or client system 12 performed by IP address verification system 214 may be skipped by third party verification service provider 200. In an alternative embodiment, if user 10 is aware that IP address 14 of client system 12 may be directed to a probable location of a server or proxy of the computing network, and not the actual location of user 10 and/or client system 12, user 10 may verify the probable geographic location of the server or proxy of computing network with verification system 204. That is, user 10 may verify the probable location based on IP address 14, even though user 10 may be located in an actual geographic location distinct from the probable geographic location.

In the example, after verification system 204 has verified both the user 10 inputted password and the phone number associated with the cellphone user 10 utilized to call third party verification service provider 200, IP address verification system 214 may provide the probable location of user 10 and/or client system 12 (e.g, Washington, D.C.) to VRU 206 to audibly provide the probable location, so user 10 may confirm or deny the location. That is VRU 206 may provide user 10 with the following record: "Based on the detected IP address, you probable geographical location is Washington, D.C. Is this correct?" User 10 may speak his answer (e.g., yes or no) or may press a key using telephonic device 16 (e.g., cellphone) to confirm or deny that user 10 and/or client system 12 is actually locate in or near Washington, D.C. Once user 10 confirms the probable location, third party verification service provider 200 via verification server 202 may send a confirmation message to the bank (e.g., service provider 100), indicating that user 10 has been verified, and user's 10 electronic transaction request may be authenticated and successfully processed. Transaction system 108 of Authentication system 104 may then process user's 10 electronic transaction request, or in the example, transfer $500 between user's 10 checking account and savings account, both held by the bank (e.g., service provider 100).

Figure 2A:
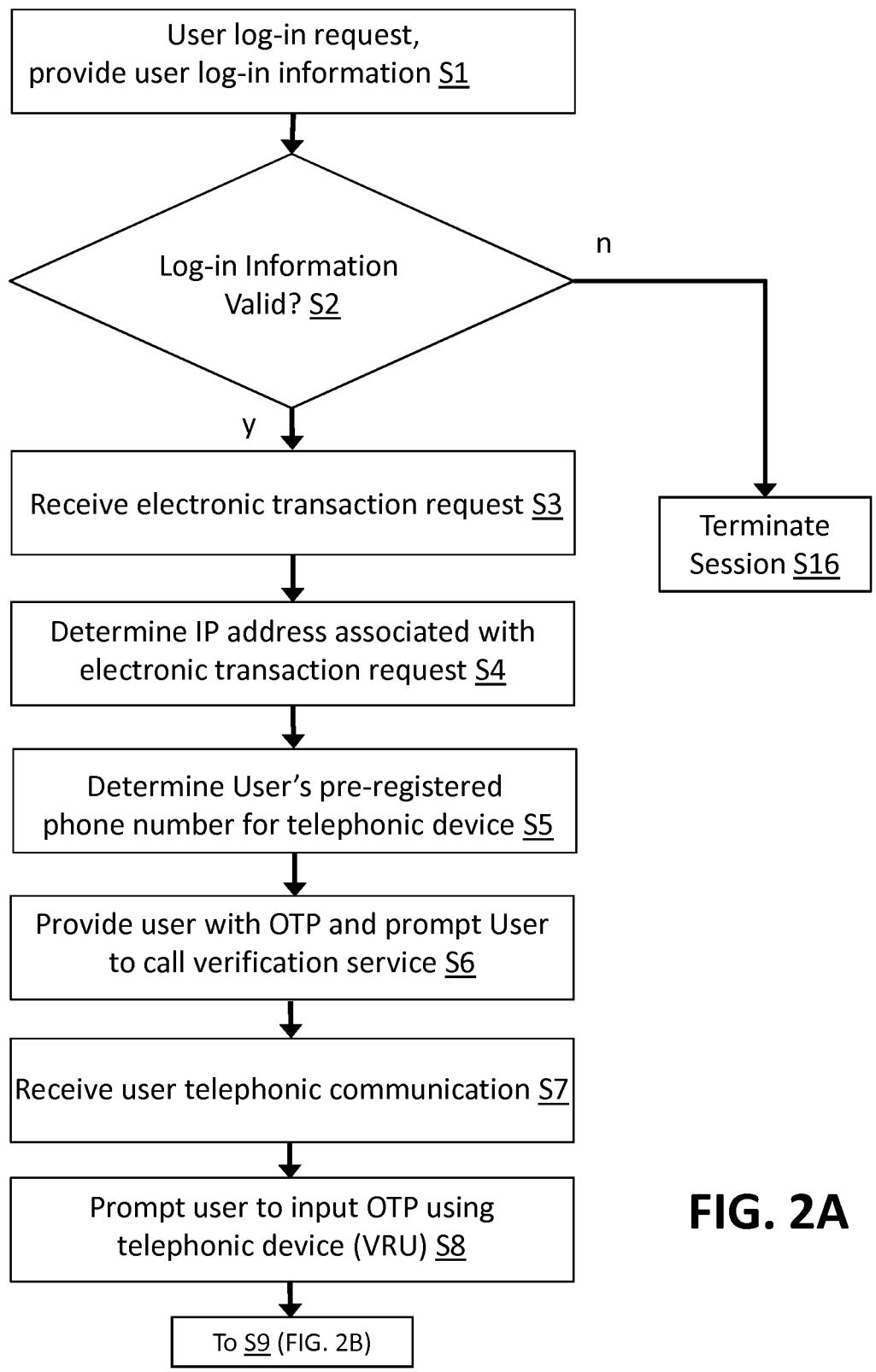
FIGS. 2A-2B show a flow diagram illustrating a method according to embodiments of the invention.
Figure 2B:
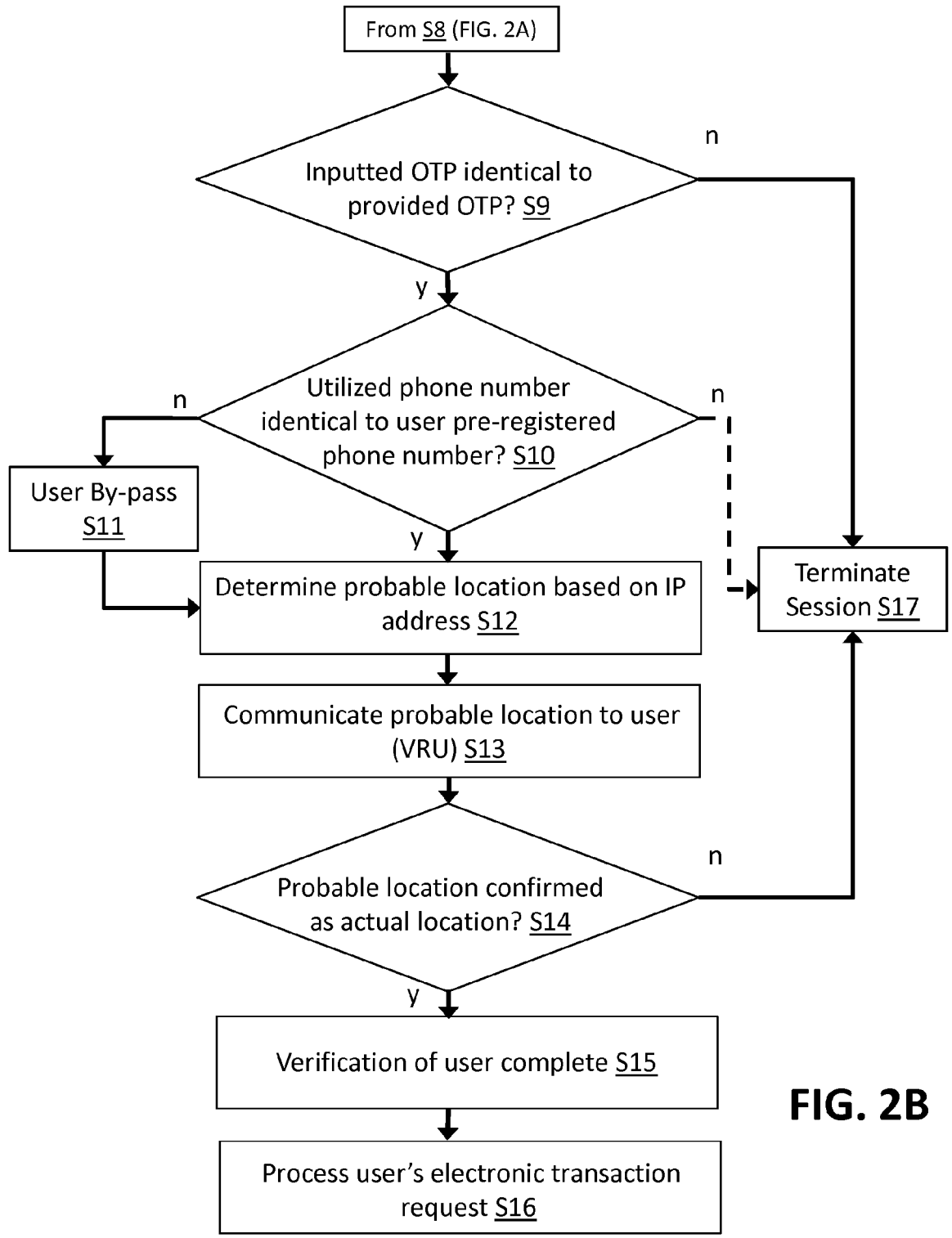

Turning to FIGS. 2A-2B, a flow diagram illustrating a method according to embodiments of the invention is disclosed. At 51, a log-in request by user 10 is obtained (e.g., accessing service provider 100 website), where log-in information is provided by user 10. At S2, it is determined if the log-in information provided by user 10 is valid. If no, the session is terminated S17. If yes, an electronic transaction request from user's 10 client system 12 is received, at S3. At S4, an IP address 14 associated with client system 12 from which the received electronic transaction request originated is determined. At S5, a pre-registered telephone number associated with telephonic device 16 of user 10 is determined. At S6, user 10 is provided with a OTP and is prompted to utilize telephonic device 16 to confirm the OTP with third party verification service provider 200.

At S7, a third party verification service provider 200 receives a telephonic communication from telephonic device 16 associated with user 10. At S8, VRU 206 of third party verification service provider 200 prompts user 10 to input the OTP using telephonic device 16. At S9, it is determined if the inputted OTP is identical to the password provided to user 10 at S6. If no, the session is terminated S17. If yes, it is determined if the phone number associated with the telephonic device used by user 10 to call third party verification service provider 200 is identical to the pre-registered phone number associated with user's 10 telephonic device 16, at S10. If no, user 10 may by-pass S10 and proceed to S12 by confirming the number of the pre-registered associated with user's 10 telephonic device 16, or confirming user 10 would like to proceed in the verification process at S11. In an optional feature, if no at S10, the session is terminated S17. If yes at 510 or user 10 by-passes 510, a probable location of user 10 and/or system client 12 is determined based on the determined IP address 14 of client system 12, at S12. At S13, VRU 206 communicates the probable location of user 10 and/or client system 12 using telephonic device 16. At S14, user 10 is prompted to confirm or deny the probable location of user 10 and/or client system 12 based on user's 10 or client system's 12 actual location. If denied, the session is terminated S17. If probable location is confirmed, third party verification service provider 200 verifies user 10 and notifies service provider 100 of user's 10 successful verification, at S15. At S16, service provider 100 authenticates and processes user's electronic transaction request.

Note that while the embodiments are described with reference to a telephonic device, the invention may be implemented with any device that has a unique discoverable identifier (e.g., phone number, email address, IP address, etc.) and can transmit a token to a third party verification service provider 200.

Referring again to FIG. 1, it is understood that each of the authentication system 104 and verification server 202 may be implemented using any type of computing device (i.e., computer system). Such a computing device generally includes a processor, input/output (I/O), memory, and bus. The processor may comprise a single processing unit, or be distributed across one or more processing units in one or more locations, e.g., on a client and server. Memory may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising authentication system 104 and/or verification system 204 could be created, maintained and/or deployed by a service provider that offers the functions described herein for customers. That is, a service provider could offer to deploy or provide the ability to provide authentication as described above.

It is understood that in addition to being implemented as a system and method, the features may be provided as one or more program products stored on computer-readable storage mediums, which when run, enables one ore more computer systems to provide authentication as described. To this extent, the computer-readable storage medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of authenticating an electronic banking transaction, the method comprising:
   receiving an electronic banking transaction request from a user, the electronic transaction request originating at a client system;
   determining an Internet Protocol (IP) address associated with the client system from which the received electronic banking transaction request originates;
   providing the user with a one time password associated with the electronic banking transaction request;
   providing the user with a third party verification number associated with the electronic banking transaction request;
   receiving a telephonic communication to the third party verification number from a telephonic device associated with the user;
   prompting the user, via a voice response unit, to input the password using the telephonic device, the telephonic device having a user number;
   authenticating the user based on a comparison of the inputted password and the provided one time password and the user number where the authenticating is performed by a third-party service provider, wherein the third-party provider is not a participant in the electronic banking transaction;
   determining a probable location of the user based on the determined IP address of the client system;
   communicating to the user, via the voice response unit, the probable location of the user based on the determined IP address associated with the client system; and
   prompting the user to confirm the probable location of the user based on the IP address associated with the client system.

2. The method of claim 1, further comprising processing the electronic banking transaction request for the user in response to the user confirming the probable location of the user based on the determined IP address is substantially similar to an actual location of the user.

3. The method of claim 1, wherein the telephonic device includes at least one of a mobile device or a telephone.

4. The method of claim 1, wherein the user number is pre-registered with the third-party service provider.

5. The method of claim 1, further comprising cancelling the electronic banking transaction request in response to one of:
   receiving a telephonic communication from a distinct telephonic device that is not associated with the user,
   determining the inputted one time password differs from the provided one time password, or
   receiving a notification from the user indicating the user has cancelled the electronic banking transaction request in response to the probable location of the user differing from an actual location of the user.

6. The method of claim 1, further comprising:
   determining if the IP address associated with the client system is included on a server proxies list; and
   performing one of:
      excluding the user from confirming the probable location of the user based on the IP address in response to determining the IP address associated with the client system is included on the server proxies list, or
      allowing the user to confirm the probable location of the user, independent of an actual location of the user, in response to determining the IP address associated with the client system is included on the server proxies list.

7. The method of claim 1, wherein the determining of the probable location of the user based on the determined IP address associated with the client system is performed by a third party service provider who is not a participant in the electronic banking transaction.

8. A computer system comprising:
   at least one computing device configured to authenticate an electronic banking transaction by performing actions including:
      receiving an electronic banking transaction request from a user, the electronic banking transaction request originating at a client system;
      determining an Internet Protocol (IP) address associated with the client system from which the received electronic banking transaction request originates;
      providing the user with a one time password associated with the electronic banking transaction request;
      providing the user with a third party verification number associated with the electronic banking transaction request;
      receiving a telephonic communication to the third party verification number from a telephonic device associated with the user;
      prompting the user, via a voice response unit, to input the password using the telephonic device, the telephonic device having a user number;
      authenticating the user based on a comparison of the inputted password and the provided password and the user number where the authenticating is performed by a third-party service provider, wherein the third-party provider is not a participant in the electronic banking transaction;
      determining a probable location of the user based on the determined IP address of the client system;
      communicating to the user, via the voice response unit, the probable location of the user based on the determined IP address associated with the client system; and
      prompting the user to confirm the probable location of the user based on the IP address associated with the client system.

9. The computer system of claim 8, further comprising:
   processing the electronic banking transaction request for the user in response to the user confirming the probable location of the user based on the determined IP address is substantially similar to an actual location of the user.

10. The computer system of claim 8, wherein the telephonic device includes at least one of a mobile device or a telephone.

11. The computer system of claim 8, wherein the user number is pre-registered with the third-party service provider.

12. The computer system of claim 8, further comprising:
cancelling the electronic banking transaction request in response to one of:
receiving a telephonic communication from a distinct telephonic device that is not associated with the user,
determining the inputted one time password differs from the provided one time password, or
receiving a notification from the user indicating the user has cancelled the electronic banking transaction request in response to the probable location of the user differing from an actual location of the user.

13. The computer system of claim 8, further comprising:
determining if the IP address associated with the client system is included on a server proxies list; and
performing one of:
excluding the user from confirming the probable location of the user based on the IP address in response to determining the IP address associated with the client system is included on the server proxies list, or
allowing the user to confirm the probable location of the user, independent of an actual location of the user, in response to determining the IP address associated with the client system is included on the server proxies list.

14. The computer system of claim 8, wherein the determining of the probable location of the user based on the determined IP address associated with the client system is performed by the third party service provider who is not a participant in the electronic banking transaction.

15. A computer program product for authenticating an electronic banking transaction, the computer program product comprising a non-transitory computer readable medium having program code embodied therewith, the program code executable by at least one computer system to perform a method comprising:
receiving an electronic banking transaction request from a user, the electronic transaction request originating at a client system;
determining an Internet Protocol (IP) address associated with the client system from which the received electronic banking transaction request originates;
providing the user with a one time password associated with the electronic banking transaction request;
providing the user with a third party verification number associated with the electronic banking transaction request;
receiving a telephonic communication to the third party verification number from a telephonic device associated with the user;
prompting the user, via a voice response unit, to input the password using the telephonic device, the telephonic device having a user number;
authenticating the user based on a comparison of the inputted password and the provided password and the user number where the authenticating is performed by a third-party service provider, wherein the third-party provider is not a participant in the electronic banking transaction;
determining a probable location of the user based on the determined IP address of the client system;
communicating to the user, via the voice response unit, the probable location of the user based on the determined IP address associated with the client system; and
prompting the user to confirm the probable location of the user based on the IP address associated with the client system.

16. The computer program product of claim 15 further comprises:
processing the electronic banking transaction request for the user in response to the user confirming the probable location of the user based on the determined IP address is substantially similar to an actual location of the user.

17. The computer program product of claim 15, wherein the telephonic device includes at least one of a mobile device or a telephone.

18. The computer program product of claim 15, wherein the user number is pre-registered with the third-party service provider.

19. The computer program product of claim 15 further comprises:
cancelling the electronic banking transaction request in response to one of:
receiving a telephonic communication from a distinct telephonic device that is not associated with the user,
determining the inputted one time password differs from the provided one time password, or
receiving a notification from the user indicating the user has cancelled the electronic banking transaction request in response to the probable location of the user differing from an actual location of the user.

20. The computer program product of claim 15 further comprises:
determining if the IP address associated with the client system is included on a server proxies list; and
performing one of:
excluding the user from confirming the probable location of the user based on the IP address in response to determining the IP address associated with the client system is included on the server proxies list, or
allowing the user to confirm the probable location of the user, independent of an actual location of the user, in response to determining the IP address associated with the client system is included on the server proxies list.

21. The computer program product of claim 15, wherein the determining of the probable location of the user based on the determined IP address associated with the client system is performed by a third party service provider who is not a participant in the electronic banking transaction.

* * * * *